United States Patent [19]
Garner

[11] 3,726,516
[45] Apr. 10, 1973

[54] CUTTING TORCH CONTOUR GENERATOR FOR CYLINDRICAL INTERSECTIONS

[75] Inventor: Kenneth B. Garner, Chattanooga, Tenn.

[73] Assignee: Combustion Engineering, Inc., Windsor, Conn.

[22] Filed: Jan. 25, 1971

[21] Appl. No.: 109,135

[52] U.S. Cl. .................................................266/23 N
[51] Int. Cl. .................................................B23k 7/04
[58] Field of Search.................266/23 D, 23 E, 23 H, 266/23 HH, 23 K, 23 L, 23 M, 23 P, 23 R, 23 N, 23 NN

[56] References Cited

UNITED STATES PATENTS

| 2,408,517 | 10/1946 | Howard | 266/23 NN X |
| 2,528,147 | 10/1950 | Jesonis | 266/23 NN |
| 2,035,765 | 3/1936 | Schmidt | 266/23 NN |
| 2,495,360 | 1/1950 | Young | 266/23 N |
| 2,985,963 | 5/1961 | Lee | 266/23 NN UX |
| 3,612,502 | 10/1971 | Vasiliev et al. | 266/23 M |

Primary Examiner—J. Spencer Overholser
Assistant Examiner—John S. Brown
Attorney—Stephen A. Schneeberger, Eldon H. Luther, Robert L. Olson, John F. Carney and Richard H. Berneike

[57] ABSTRACT

A cylindrical intersection contour generator having an adjustable cutting torch which is particularly controlled in the rise and fall, thereof by a rotating crank, as the torch moves relatively about the circumference of one of the cylindrical shaped objects. The initial positioning of the cutting torch as to its radius, vertical height and cutting angle, the particular throw of the crank, and the settings for controlling the rise and fall and the cutting angle of the cutting torch during relative rotation are predetermined on the basis of the diameter and wall thickness of the cylindrical shapes to be joined and the ratio of their respective diameters.

9 Claims, 8 Drawing Figures

INVENTOR.
KENNETH B. GARNER

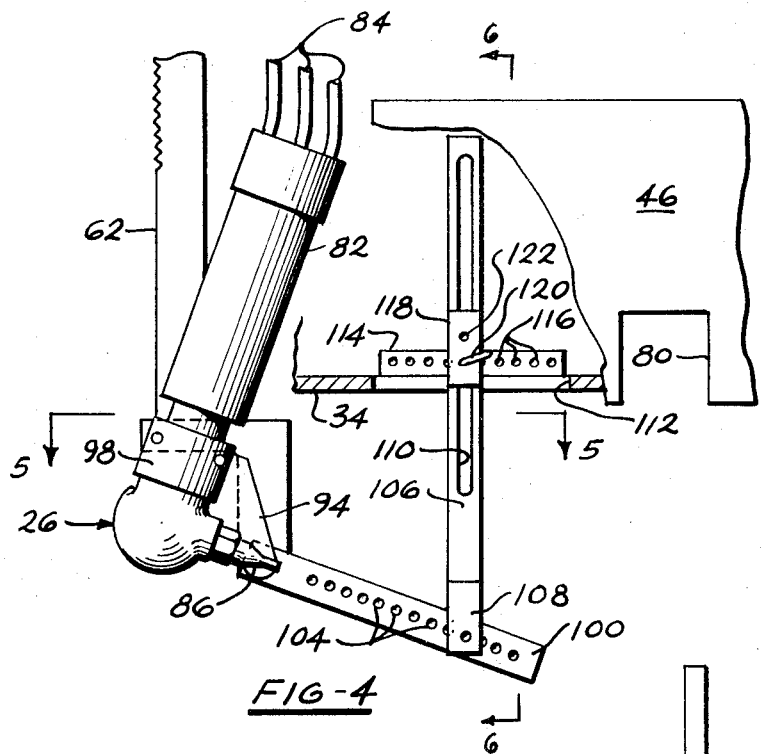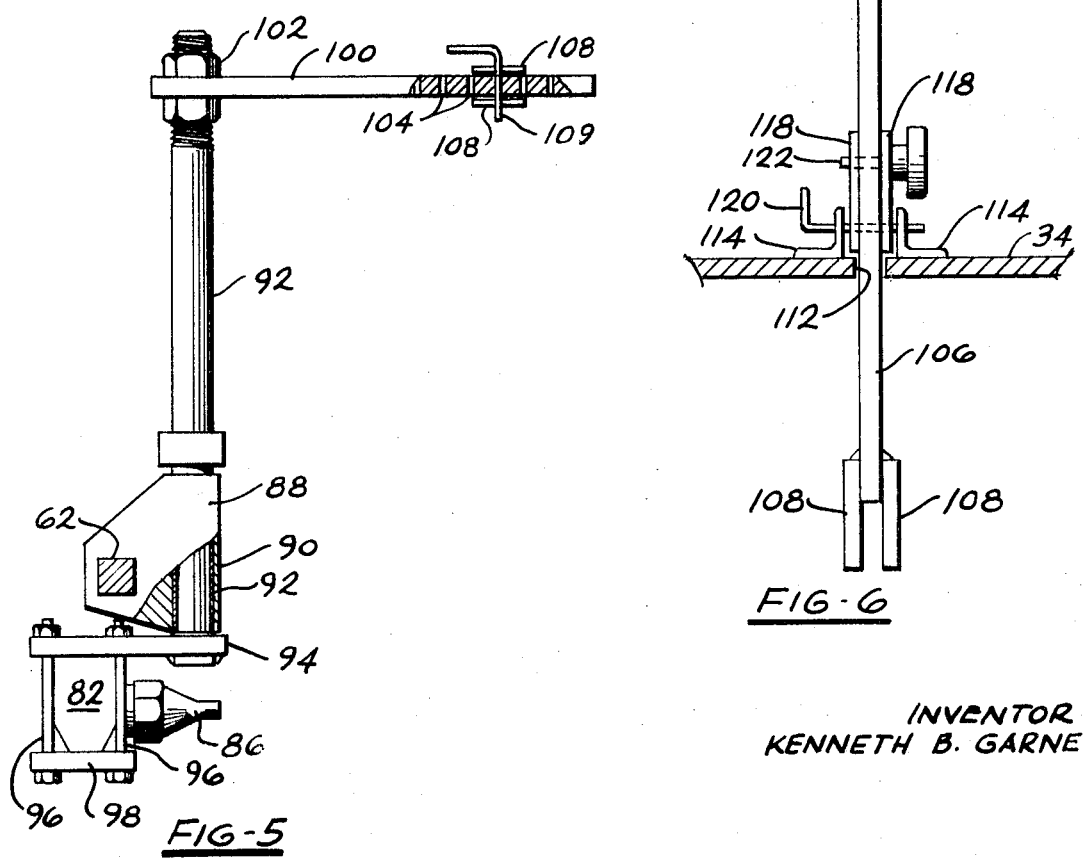

INVENTOR
KENNETH B. GARNER

CUTTING TORCH CONTOUR GENERATOR FOR CYLINDRICAL INTERSECTIONS

BACKGROUND OF THE INVENTION

In the manufacture of steam generating systems, there are many instances when two cylindrical shapes must be joined together. Depending upon the wall thicknesses of the shapes to be joined and their relative diameters, the geometrical intersections of the cylinders may create problem areas in that one cylinder could intercept the flow area of the cylinder to which it is to be joined. An illustrative example of a situation in steam generator system construction in which problem geometrical intersections may occur is the joining of a downcomer nozzle to its respective pressure vessel.

In order to eliminate the problem of area intersection, the intercepting cylinder must be precontoured or, alternatively, have the flow area intercepting portion thereof machined away after the cylinders are joined. Machining off of the excess material is a time-consuming process which requires the work to be accomplished under extremely adverse conditions. Therefore, precontouring is the preferred procedure in obtaining the proper geometrical intersection of the cylindrical surfaces.

Precontouring may also yield special problems, in that the contour form must be sufficiently accurate to provide proper mating between the cylinders to be joined. If the contour is not controlled with a sufficient degree of accuracy, upon joining the cylindrical shaped objects, a geometrical intersection problem similar to that described above may still be found to exist. To accomplish a desired contour, it has been necessary to use either a geometrical facsimilie (shaped model cylinder or multiple slide and linkage arrangement) or a tracking wheel riding on the cylinder being contoured to guide the movement of the cutting torch. Both procedures require complicated machines having intricate linkage systems for the requisite cutting torch control which introduces additional possibilities for error. The machines which depend upon a surface to direct the action of the torch are acutely subject to surface conditions which may result in uneven cutting motions of the cutting torch with resultant contour error.

SUMMARY OF THE INVENTION

It is the object of the novel contour generating apparatus herein provided to produce accurate geometrical intersection surfaces between a variety of cylindrical shapes in a simple and relatively less expensive manner without the use of geometrical facsimilies or tracking wheels, and therefore subject to a lesser degree to mechanical error or surface imperfections. An adjustable cutting torch having relative movement with a cylindrical shape to be contoured is particularly controlled in its vertical rise and fall motion by a rotating crank, the rotation of which is in turn controlled by and specifically related to the relative movement of the torch about the circumference of the cylindrical shaped object. The initial positioning of the cutting torch, as to its radius vertical height and cutting angle, the throw of the crank, and the setting for controlling the rise and fall and the cutting angle of the cutting torch during relative rotation with the cylindrical shape are predetermined on the basis of the diameter and wall thickness of the cylindrical shapes to be joined and the ratio of their respective diameters.

BRIEF DESCRIPTION OF THE DRAWINGS

FIG. 4 is a detailed view of the cutting torch angular control mechanism according to this invention.

FIG. 5 is a plan view along line 5—5 of FIG. 4.

FIG. 6 is an end view along line 6—6 of FIG. 4.

DESCRIPTION OF THE PREFERRED EMBODIMENT

Figure 1:
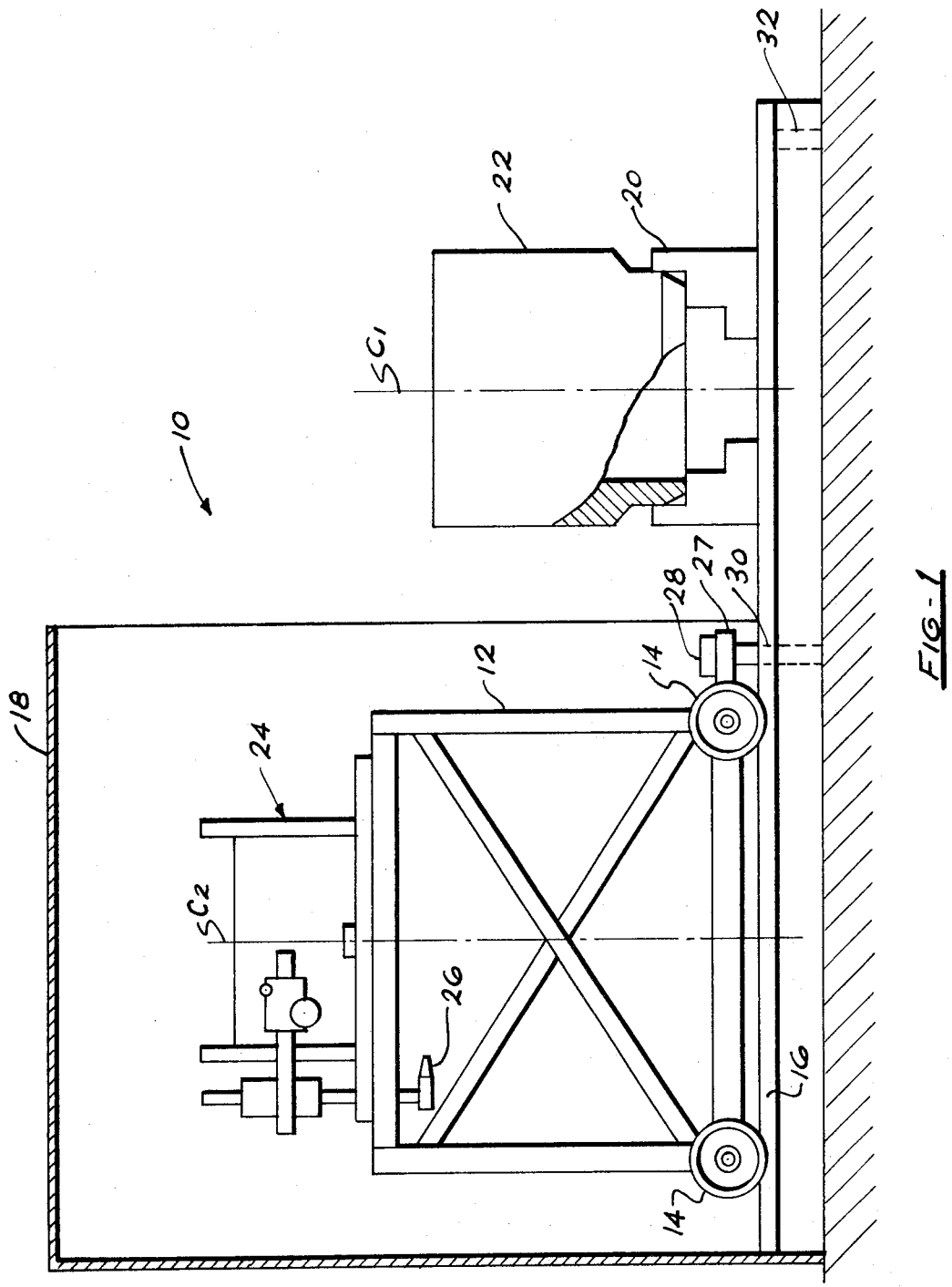
FIG. 1 is a side elevational view of the contour generator arrangement of this invention and its positioned relationship to a nozzle to be contoured.

Referring now to the drawings, FIG. 1 shows the cylindrical intersection contour generator arrangement 10 of this invention. The arrangement 10 comprises a carriage 12 having wheels 14 which ride on a track system 16. Surrounding one end of the track system 16 is a garage housing 18 which protects the carriage 12 when not in use. At the other end of the track system 16 is a jig arrangement 20 which fixedly supports a cylindrical shape to be contoured, as for example the nozzle 22.

Mounted on the carriage 12 is a cutting torch control mechanism 24 which supports a cutting torch 26 in a manner to be described hereinbelow. Extending from the forward portion of the carriage 12 is an extension 27 which supports a positioning pin 28. The positioning pin 28 is adapted to be inserted in a receptacle 30 to lock the carriage in position within the garage 18 or, alternatively, to be inserted in a receptacle 32 at the outer end of track 16. The receptacle 32 serves to position the carriage such that the center line $C_1$ of the jig 20 and the center line $C_2$ of the torch control mechanism 24 are coincident.

Figure 2:
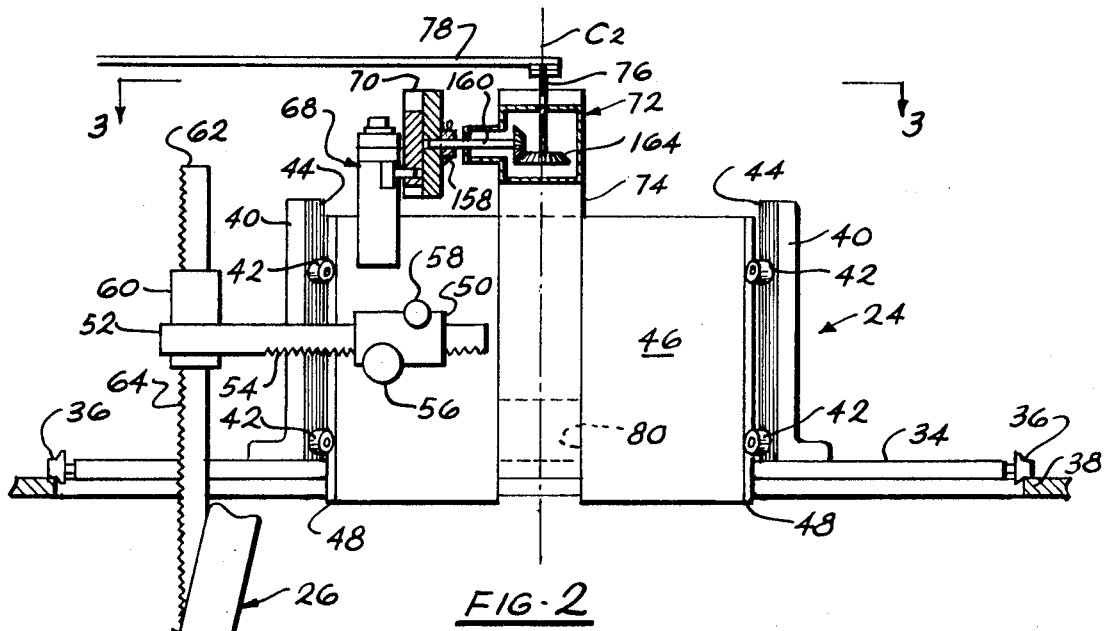
FIG. 2 is a detailed side elevation of the rise-and-fall control mechanism for the cutting torch according to this invention.
Figure 3:
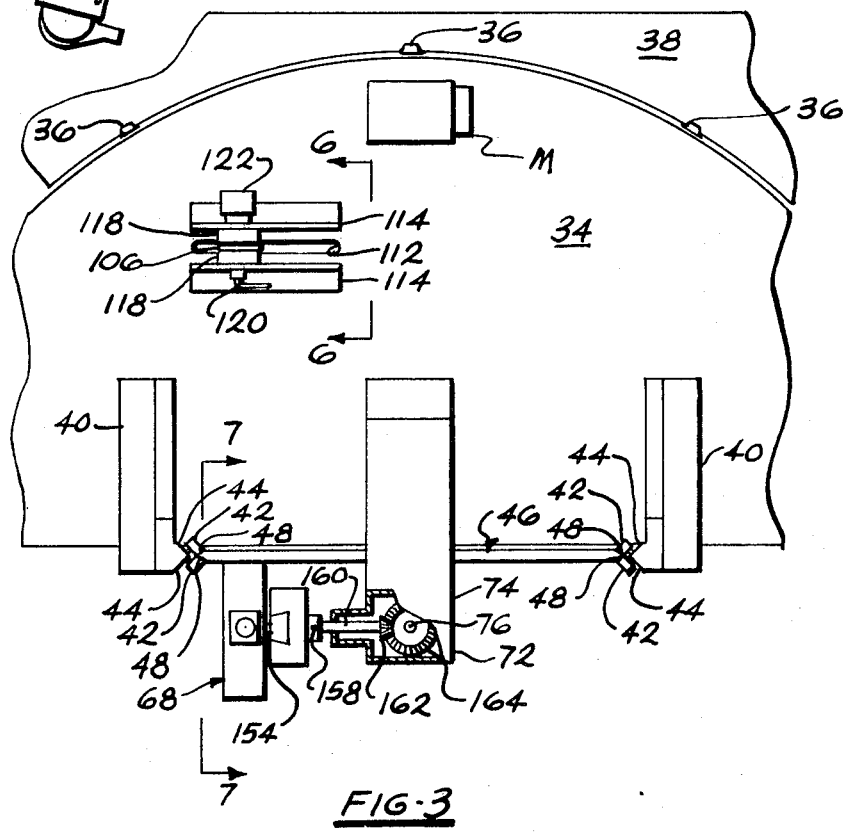
FIG. 3 is a plan view taken on line 3—3 of FIG. 2.

The torch control mechanism 24 is best shown in FIGS 2 and 3. The control mechanism 24 is mounted on a rotating base 34 which has casters 36 connected thereto to permit the base 34 to rotate, about the center line $C_2$, on a table 38 which forms the top of the carriage 12. Rotation of the base 34 is accomplished through action of a drive motor M in a well known manner. From the base 34 there are upstanding supports 40 which have guide wheels 42 rotatably mounted on opposed V-surfaces 44 thereof. Between the supports 40 and overlying the forward edge of the base 34 is a cutting torch carrier 46 which has V-surfaces 48 located opposite the V-surfaces 44 of the supports 40, the carrier 46 being guided in its vertical movement by the wheels 42.

Supported on the carrier 46 is a housing 50 through which a horizontal control arm 52 extends. The horizontal control arm 52 has a series of teeth 54 which are intermeshed with a drive wheel 56, associated with the housing 50, to control the horizontal position of the arm 52. A locking means 58 is provided to lock the arm 52 in the desired position of horizontal extension. Attached to the outer end of the horizontal control arm 52 is a housing 60 through which a vertical control arm 62 extends. The vertical control arm 62 has a series of teeth 64 which intermesh with a drive wheel (not shown) to control the vertical position thereof. The arm 62 may also have a cooperating locking means (not shown) similar to locking means 58 to lock the arm at any desired vertical location. The cutting torch 26 is fixed to the end of vertical control arm 62 for motion therewith in a manner to be described hereinbelow.

Also attached to the carrier 46 is a motion follower 68. The motion follower 68 is caused to reciprocate in a vertical plane by a crank arrangement 70 which is in turn driven by a gear arrangement 72 carried by a support 74 fixed to the rotating base 34. The gear arrangement 72 has a shaft 76 extending vertically therefrom which is connected to an arm 78 which is nonrotating with respect to table 38. The carrier 46 has a cutout portion 80 formed therein so as to permit the carrier to move vertically under the influence of the crank arrangement 70 without having the support 74 interfere with its movement.

The cutting torch 26 and the mechanism for controlling its angular orientation with respect to the nozzle to be contoured is best shown in FIGS. 4–6. The cutting torch 26 comprises a torch housing 82 which has tubing 84 connected thereto to supply the necessary gases and flux to a torch nozzle 86, the nozzle 86 extending from and rotatable relative to the housing 82. The torch 26 is connected to the vertical control arm 62 in the following manner. The arm 62 is connected to a support 88 which carries a bearing 90 through which a shaft 92 is rotatably supported. Fixed to one end of the shaft 92 for rotation therewith is a first plate 94 which is connected through tie rods 96 to a second plate 98. These plates entrap the torch housing 82 so that the housing 82 will have a corresponding movement therewith upon rotation of the shaft 92. The angular control of the shaft 92, and thus the torch 26, is accomplished by a first angular control arm 100 which is rigidly connected to the shaft 92 by the locking mechanism 102. A biasing means, such as a spring (not shown) is connected between the arm 100 and the support 88 so as to bias the arm 100 to a horizontal position. The arm 100 has a series of holes 104 which enable a varying degree of angular adjustment to be selected for optimum cutting efficiency depending upon the nozzle diameter and the particular contour desired.

The first angular control arm 100 is connected to a second angular control arm 106 which extends substantially vertically therefrom. The arm 106 has extensions 108 at the lower end thereof which have holes 109 therethrough which permit the joining of the second angular control arm 106 to the first angular control arm 100. Further, the second arm 106 has a slot 110 extending substantially the length thereof to permit vertical adjustment. The rotating base 34 has a slot 112 therein (see FIGS. 3, 4 and 6) which permits the passage of the second angular control arm 106 therethrough when in its vertical position. Adjacent the slot 112 are angular control arm guides 114 which have a series of holes 116 therein so as to permit horizontal adjustment of the arm 106 to a preselected position according to the particular dimensions of the nozzle to be contoured. On opposite sides of the control arm 106 and between the guides 114 are plates 118 through which pivot pin 120 and locking screw 122 extend so as to permit the second angular control arm 106 to pivot about the pin 120 while locking the arm 106 in a particular selected vertical position depending upon the geometry of the cylindrical shapes to be joined.

Figure 7:
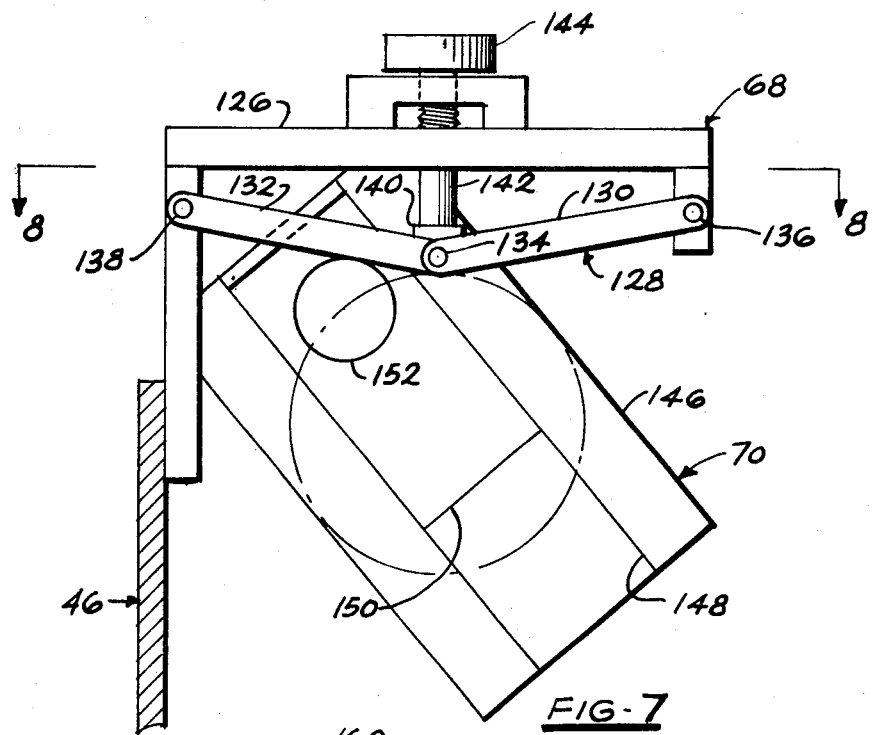
FIG. 7 is a view of the crank mechanism along line 7—7 of FIG. 3.
Figure 8:
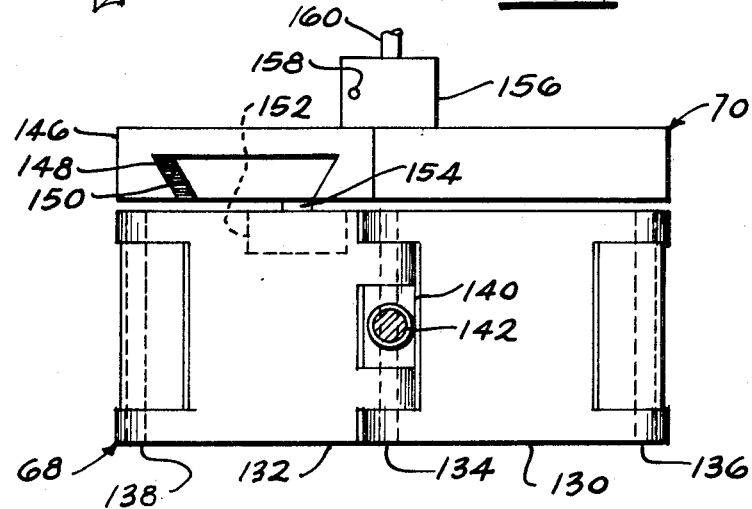
FIG. 8 is a plan view along line 8—8 of FIG. 7.

The vertical rise and fall of the carrier 46 is controlled by the motion follower 68 and the crank arrangement 70 which are best shown in FIGS. 7 and 8. The motion follower 68 comprises a frame 126 which has an adjustable surface 128 extending therefrom. The adjustable surface 128 is made up of intermeshing plates 130 and 132 pivotally supported by a central interconnecting pivot pin 134 and end pivot pins 136, 138 connected to the frame 126. An adjusting trunion 140 is positioned between the plates 130, 132 and surrounds the central pivot pin 134. An adjusting screw 142 which has a control knob 144 acts upon the adjusting trunion 140 to control the shape of the surface 128. The purpose of the adjustable surface 128 is to extend the operating range of the contour generator arrangement 10 to include a wider ratio of cylindrical shape diameters upon which proper contouring may be accomplished. With the adjustable surface 128 the contour generator arrangement can handle shapes with a diametrical ratio of up to 3:4 and greater.

The crank arrangement 70 comprises a roller block support 146 which has a dove-tailed groove 148 therein. A roller block 150 mates with the dove-tailed groove 148 and is slidably positionable therein to adjust the crank throw. The block 150 carries a roller 152 on a shaft 154 extending from the block. On the opposite side of the support 146 is a boss 156 having a locking means 158 which secures the support 146 to the shaft 160 of the gear arrangement 72. The shaft 160 is connected to a spiral pinion 162 which intermeshes with a beveled gear 164 (see FIG. 3), the ratio of the two gears being such that there will be a speed increase in the rotation shaft 160 in the ratio of 2:1.

The operation of the above-described contour generating arrangement 10 is as follows. Computer techniques are utilized in determining optimum settings for the crank throw and the cutting torch location and inclination angle controlling mechanisms for all practical variations in cylindrical shaped objects to be joined. The particular settings are based on the diameters and wall thicknesses of each of the cylindrical shapes and the ratio of their respective diameters. Thus, when the dimensions of the cylindrical shapes to be joined are known, the necessary regulating settings are readily determined.

Following an illustrative example, a cylindrical shaped object to be contoured, such as nozzle 22, is positioned in the jig 20 so as to have the center line thereof coincident with the jig center line $C_1$. The jig 20 is elevationally positioned so that the nozzle 22 will be located within the vertical operating range of the contour generating arrangement 10. After the nozzle 22 is positioned, pin 28 will be removed from receptacle 30 and the carriage 12 will be moved from the garage 18 to overlie the nozzle. Pin 28 will then be inserted in receptacle 32 so that the center line $C_1$ and the center line $C_2$ of the torch control mechanism 24 will be locked in a coincident relationship. The horizontal arm 52 and the vertical arm 62 may then be manipulated by their respective drive wheels and locked in place to establish the initial operating position of the cutting torch 26.

The roller 152 is located in the support 146 by movement of the block 150 to yield a crank throw as selected from the computer indication determined by the geometry of the cylindrical shaped objects which are to be placed in the intersecting configuration. The computerized indications will also be used to determine the shape of surface 128 and to set the correct orientation of the cutting torch angular control arms 100 and 106. That is to say, that dependent upon the relative diameters of the cylindrical shapes and the wall thicknesses of the objects to be contoured, the particular holes 104 and 116 in which the pins 109 and 120, respectively, will be located are selected and the shape of surface 128 will be set by adjusting screw 142. The setting for the locking screw 122 is similarly determined, but the locking screw is left loose initially to permit the arm 106 to slide freely in a vertical mode.

The torch nozzle 86 is oriented with respect to the nozzle 22 to be contoured by rotation in the housing 82 so as to present the optimum cutting angle to the nozzle 22. The torch nozzle 86 will be maintained in this position due to the effect of the biasing means which maintain arm 100 in a horizontal position (as long as arm 106 is free to move vertically). Vertical motion of the arm 62 is then used to control the initial cut of the nozzle 22 to the elevation at which the contour generation is to begin. At the desired vertical elevation, locking screw 122 is tightened down to lock the arm 106 in position to permit activation of the torch angle control mechanism.

After the torch angle control mechanism is armed, the operation of the motor M is initiated and the desired contour will be accurately generated without further attention by the operator. This is accomplished due to the fact that the shaft 76 is connected to the nonrotating arm 78 which restrains the gear 164 from movement. Thus, as the rotating base 34 and its related contour generating mechanism traverse about the center line $C_2$ due to the action of the motor M, the pinion 162 will cause the shaft 160 to which it is connected to rotate as it (pinion 162) traverses the stationary bevel gear 164. This rotation of the shaft 160, with a ratio of 2:1 with respect to the speed of rotation of the base 34, will cause the crank arrangement 70 to rotate at twice the rate of the rotation of the base 34. The motion follower 68 will follow the roller 152 of the crank arrangement 70 thus yielding a vertical rise and fall of the cutting torch carrier 46 and the cutting torch 26 carried by the vertical control arm 62 in direct relation to rotation of the base 34. There will, of course, be two complete rise and fall cycles for one complete rotation of the base 34 so as to obtain the proper desired contour.

As the carrier 46 rises and falls, the angle of the torch nozzle 86 of the cutting torch 26 with respect to the surface being contoured will be controlled by the motion of the first angular control arm 100 which pivots about the pin 109 and the base of the second angular control arm 106. Thus the angle of the torch nozzle 86 will always be maintained in an optimumly associated relationship with the surface being contoured for maximum cutting efficiency and proper surface contouring.

From the foregoing it can be seen that there is herein provided a novel contour generating arrangement for forming geometrical intersection surfaces between a variety of cylindrical shaped objects. By utilizing computer techniques to determine settings to control the vertical rise and fall and the angular orientation of a cutting torch moving relatively about a particular cylindrical shape, intersection contours may be generated depending upon the relative shape geometries without the use of geometrical facsimilies or tracking wheels riding on the shape being cut. Therefore, a simple efficient device producing greater accuracy and consistency of contours is accomplished.

While this preferred embodiment of the invention has been shown and described, it will be understood that it is merely illustrative and that changes may be made without departing from the scope of the invention as claimed.

What is claimed is:

1. An apparatus for generating a contoured intersection surface on one of two intersecting cylindrical shapes comprising:
    a cutting torch carrier;
    a contoured surface cutting torch adjustably supported by said carrier for horizontal, vertical and angular motion with respect thereto;
    means for controlling the initial horizontal and vertical location of the contoured surface cutting torch relative to the cylindrical shaped object to be contoured;
    a carriage for carrying said cutting torch carrier while permitting said carrier to have a vertical mode of movement;
    means for accurately positioning said carriage relative to said cylindrical shaped object to be contoured;
    actuating means providing relative rotational and vertical movement between said contoured surface cutting torch and said cylindrical object to be contoured;
    means for controlling the vertical movement of said carrier in relationship to the relative rotation between said contoured surface cutting torch and said cylindrical shaped object to be contoured so that the desired geometrical intersection surface may be achieved; and
    means responsive to the vertical movement of said carrier for adjusting the angular orientation of said contoured surface cutting torch relative to said cylindrical shaped object to be contoured.

2. The apparatus of claim 1 wherein said means for adjusting the angular orientation of said contoured surface cutting torch comprises:
    a shaft supported by said cutting torch carrier for rotation relative thereto, said shaft having said cutting torch affixed thereto at one end for rotation therewith;
    a first angular control arm affixed to said shaft at the end opposite said cutting torch;
    a second angular control arm having one end adjustably pivotally connected to said first angular control arm and the other end extending substantially vertically therefrom; and
    means for fixing the vertical location of said other end of said second angular control arm so that the vertical movement of said carrier relative to said other end of said second angular control arm causes said shaft to rotate relative to said carrier to adjust the angular orientation of said cutting torch.

3. The apparatus of claim 2 wherein said means for controlling the initial horizontal and vertical location of the contoured surface cutting torch includes an adjustable horizontal arm supported on said carrier for horizontal movement relative thereto, an adjustable vertical arm supported at the outer end of said horizontal arm and vertically adjustable with respect thereto, and a support fixed to the end of said vertical arm, said support supporting said shaft of said means for adjusting the angular orientation of said contoured surface cutting torch for rotation therewithin.

4. The apparatus of claim 3 wherein said cutting torch carrier is a vertically oriented frame plate having the opposite vertical edges thereof of a V-shaped configuration; and wherein said carriage includes a frame movable to overlie a shape to be contoured, a rotatable base carried by said frame, said rotatable base having vertical supports thereon, said supports having V-shaped edges and guide wheels opposing the V-shaped edges of said cutting torch carrier for retaining said cutting torch carrier while permitting the vertical movement thereof.

5. The apparatus of claim 4 wherein said means for accurately positioning said carriage relative to said shape to be contoured includes an extension on the frame of said carriage, a pin removably located through an opening in said extension, and a receptacle in fixed relationship to said shape to be contoured, said receptacle adapted to receive said pin so as to accurately position said carriage frame relative to said shape to be contoured.

6. The apparatus of claim 5 wherein said actuating means for providing relative movement between said cutting torch and said shape to be contoured includes a motor for rotating the base of said carriage about its central axis.

7. The apparatus of claim 6 wherein the means for controlling the vertical movement of said carrier in relationship to the movement of said cutting torch with respect to said shape to be contoured includes a crank mechanism having a nonrotatable arm, a beveled gear attached to said non-rotatable arm, a pinion gear supported by said base of said carriage for movement therewith, said pinion gear intermeshed with said beveled gear so as to rotate as it traverses around said beveled gear when said base is rotated about its central axis, a shaft connected to said pinion gear which rotates due to the movement of said pinion gear, an adjustable roller arrangement fixed to said pinion shaft for rotation therewith and a motion follower means fixed to said cutting torch carrier and in positive engagement with said roller mechanism for movement therewith.

8. The apparatus of claim 7 wherein the ratio of the beveled gear to the pinion gear is such that there will be a 2:1 speed increase in the rotation of the pinion gear.

9. The apparatus of claim 8 wherein said motion follower means includes an adjustably shaped surface against which the adjustable roller arrangement of said crank mechanism is in positive engagement whereby the operating range of said crank mechanism is extended to cover a ratio of cylindrical shaped objects diameters of at least up to 3:4.

* * * * *